(12) United States Patent
Andersen (10) Patent No.: US 8,527,940 B2
(45) Date of Patent: Sep. 3, 2013

(54) INTEGRATED DEVELOPMENT ENVIRONMENT WITH AUTOMATIC WORKING SETS

(75) Inventor: Max Rydahl Andersen, Neuchatel (CH)

(73) Assignee: Red Hat, Inc., Raleigh, NC (US)

( * ) Notice: Subject to any disclaimer, the term of this patent is extended or adjusted under 35 U.S.C. 154(b) by 687 days.

(21) Appl. No.: 12/713,060

(22) Filed: Feb. 25, 2010

(65) Prior Publication Data

US 2011/0209114 A1 Aug. 25, 2011

(51) Int. Cl.
*G06F 9/44* (2006.01)
(52) U.S. Cl.
USPC ............ 717/105; 717/109; 717/120; 717/122
(58) Field of Classification Search
None
See application file for complete search history.

(56) References Cited

U.S. PATENT DOCUMENTS 7,055,130 B2 * 5/2006 Charisius et al. ............. 717/108

OTHER PUBLICATIONS

Eclipse Workbench User Guide, http://help.eclipse.org/galileo/index.jsp, released Jun. 2009, 371 pages.

* cited by examiner

*Primary Examiner* — Chuck Kendall
(74) *Attorney, Agent, or Firm* — Lowenstein Sandler LLP (57) ABSTRACT

A processing device executing an integrated development environment scans for available projects, each project having a directory structure that contains source code. The processing device identifies available projects that match predetermined criteria. The processing device then automatically groups the projects that match the predetermined criteria into a working set, wherein projects arranged into the working set are visually presented to a user together, and wherein one or more operations can be performed on every project in the working set based on a single user command.

19 Claims, 6 Drawing Sheets

INTEGRATED DEVELOPMENT ENVIRONMENT WITH AUTOMATIC WORKING SETS

TECHNICAL FIELD

Embodiments of the present invention relate to software development, and more specifically to project organization within an integrated development environment.

BACKGROUND

Integrated development environments provide programmers with tools that help in the development of new software. Often, many projects that a programmer works on are related. However, in conventional integrated development environments the programmers must manually arrange projects. Conventional integrated development environments do not automatically group and manage associations between related projects for the programmer.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for automatically grouping and managing associations between projects in an integrated development environment (IDE). In one embodiment, a processing device executing an integrated development environment scans for available projects, each project having a directory structure that contains source code. The processing device identifies available projects that match predetermined criteria. The processing device then automatically groups the projects that match the predetermined criteria into a working set. The projects that are arranged into the working set are visually presented to a user together. In one embodiment, a single user command can cause one or more operations to be performed on every project in the working set. As new criteria are added, the grouping of the projects in the working set may automatically be updated.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "scanning", "identifying", "grouping", "determining", "deploying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Figure 1A:
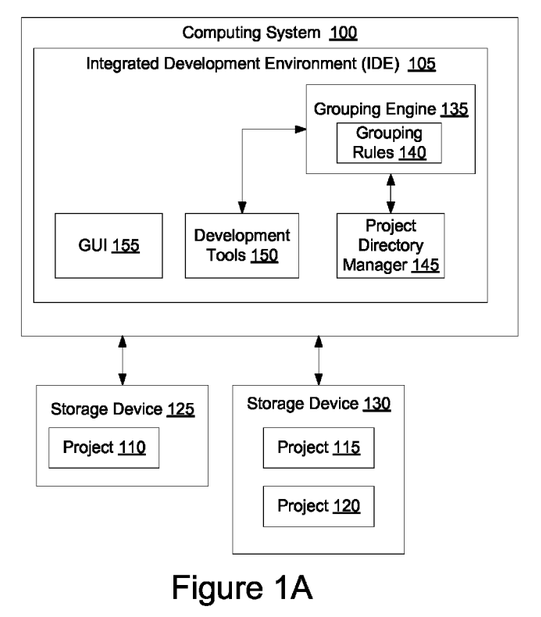
FIG. 1A illustrates an exemplary computer system, in which embodiments of the present invention may operate.

FIG. 1A illustrates a block diagram of an exemplary computing system 100, in which embodiments of the present invention may operate. The computing system 100 may be a desktop computer, laptop computer, server (e.g., web servers), personal digital assistant (PDAs), etc. The computing system 100 may be an individual computing device or a cluster of multiple computing devices.

The computing system 100 may be connected to one or more storage devices (e.g., storage device 125 and storage device 130). The storage devices 125, 130 may be hard disk drives, optical drives, tape backup drives, or a combination thereof. The storage devices 125, 130 may be internal or external storage devices. Moreover, the storage devices 125 may be local storage devices that are directly connected to the computing system, or remote storage devices with which the computing system is networked (e.g., via a private network such as a local area network (LAN) or wide area network (WAN) or a public network such as the internet).

The computing system 100 includes an integrated development environment (IDE) 105. The integrated development environment (IDE) 105 is an application that facilitates software development by providing multiple development tools 150 in a unified interface, which may be a graphical user interface 155 or a command line interface. Development tools 150 may include, for example, a source code editor, a compiler and/or interpreter, automation tools (e.g., a packager), a debugger, and so on. Through these tools, the IDE 105 enables a programmer to author, modify, compile, package, deploy, and/or debug software in an efficient manner. The IDE 105 in one embodiment supports multiple programming languages (e.g., Visual Basic, C++, Java, Python, Perl, Fortran, Cobol, etc.). Alternatively, IDE 105 may be configured to support only a single programming language, such as Java or C++.

The IDE 105 manages projects 110, 115, 120, each of which represents an application or service that is in development. The application or service may be an application to run on a specific operating system, a web service, a service accessible via a distributed computing system, etc. Projects 110, 115, 120 may be stored on the one or more storage devices 125, 130. For example, in the illustrated embodiment, project 110 is stored on storage device 125 and projects 115 and 120 are stored on storage device 130.

Figure 1B:
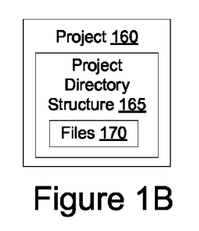
FIG. 1B illustrates an example project, in accordance with one embodiment of the present invention.

Referring to FIG. 1B, a project 160 maps to a specific project directory structure 165. Each project directory structure 165 is an organization of folders and files related to a specific project 160. The organization of project directory structures 165 may be based on user preference, a type of application or service being developed, programming languages being used, etc. In one embodiment, the project directory structure 165 is user-defined. For example, a programmer may generate and organize multiple folders for a project (e.g., a bin folder, root folder, class folder, etc.), and place different files 170 in each folder. Alternatively, project directory structures 165 may be automatically provided by the IDE 105. Such provided project directory structures 165 may be common directory structures used for specified types of programs or services. In one embodiment, project directory structures are provided as templates. Templates reflect common development structures, and automatically determine necessary associations for a user if the user uses one of the common development structures. Project directory structures 165 may share a similar format (e.g., share sibling subdirectories), or may be differently formatted.

Each project directory structure 165 contains files 170 that are created and modified by a user for a project 160. Each of the files 170 is accessible to programs and tools of the IDE 105, and to an underlying operating system. At least some files 170 included in the directory structure 165 include source code. The number and types of files 170 included in a project 160 may depend on the complexity of the project 160, purpose of the project 160, programming preference of the user, and/or on other variables. Examples of file types include class files, jar files, deployment descriptors, etc.

Referring back to FIG. 1A, in one embodiment, the IDE 105 includes a project directory manager 145 (also known as a project explorer) that maintains a map of where each project 110, 115, 120 is stored. The project directory manager 145 may also identify the project directory structure of each project 110, 115, 120, including the folders and files included in the projects 110, 115, 120. The project directory manager 145 in one embodiment also maintains an identification of working sets into which the projects 110, 115, 120 have been divided.

In one embodiment, the IDE 105 includes a grouping engine 135 that automatically divides projects 110, 115, 120 into working sets based on grouping rules 140. Each working set is a logical arrangement of projects. Projects in a working set may be presented via a user interface together (e.g., as a set). Development tools 150 may also perform operations on an entire working set as opposed to performing the operations on a single project. For example, a source code editor may save the source code of all open projects in a working set based on a single user issued save command. If no working set were used, then a user would have to issue a separate save command for each open project. Examples of other operations that may be performed on entire working sets include delete, subversion (including checking out code from a central repository and checking in code to the central repository), build, rebuild, etc. Therefore, working sets can save user time.

Grouping engine 135 may contain multiple sets of grouping rules 140. Each set of grouping rules 140 may include the criteria that projects need to satisfy to be members of a particular working set. Grouping rules 140 may include a naming requirement, which requires that members of a working set have a particular name. For example, all projects with "kernel.dev" in their title may be included in a single working set. Grouping rules may also include project location requirements (e.g., based on what storage devices projects are physically stored on). Grouping rules may also include project directory structure and/or file requirements. For example, all projects that include a specified subfolder or file in their project directory structure may be included in a working set. Alternatively, all projects that include a certain number of files, certain types of files, etc. may be arranged into a working set. Other criteria that may be included in grouping rules include project date, a template used to generate a project (e.g., projects generated from a particular template may be members of a working set), metadata associated with the project, and so forth. These are just some examples of criteria that grouping rules 140 include for arranging projects into working sets. A single set of grouping rules 140 may apply only a single criterion (e.g., a naming criterion), or multiple criteria (e.g., a naming criterion and a file type criterion).

In one embodiment, a project is marked as being a member of a working set by adding metadata (e.g., a tag) to the project for the working set with which the project is associated. Alternatively, or in addition, grouping engine 135 may generate and maintain one or more working set data structures (not shown) that include a list of members. Grouping engine 135 may generate a separate data structure for each working set that contains a list of all projects included in that working set. Alternatively, grouping engine 135 may generate a single data structure that includes all working sets, and identifies which projects belong to which working sets.

In one embodiment, placing a project in a working set does not change a physical location of the project. Alternatively, a project may be automatically copied and or moved to a specific location when it is assigned to a particular working set.

As a project 160 is developed, multiple properties of the project may change. For example, the project directory structure, files within the project directory structure, a name of the project, and so forth may change during project development. In one embodiment, grouping engine 135 updates working sets as projects change. For example, if one working set includes all projects that include the name "Best Project," and a project in the "Best Project" working set has had its name changed from "Best Project 1" to "Okay Project 1," the project may be removed from the "Best Project" working set.

In addition to projects changing, grouping rules 140 for grouping projects into working sets may also change, and/or new grouping rules 140 may be added. If grouping rules for a working set change, then the members of that working set may also change. If grouping rules for a new working set are added, then membership for the new working set may be established.

In one embodiment, the grouping engine 135 periodically (e.g., every minute, every hour, etc.) or continuously checks to see whether any new working sets should be added and/or whether any existing working sets should be modified. Alternatively, the grouping engine 135 may verify the membership of working sets and/or add new working sets upon receiving a user command to do so.

New projects may be routinely generated in the IDE 105. When a new project is generated, grouping engine 135 may automatically apply the grouping rules 140 to determine whether the new project belongs in any working set. If the new project does belong in a working set, it may be automatically added to that working set.

Figure 1C:
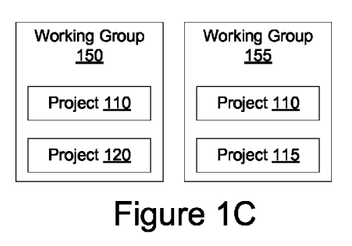
FIG. 1C illustrates two working sets that have been generated by a grouping engine, in accordance with one embodiment of the present invention.

FIG. 1C illustrates two working sets that have been generated by the grouping engine 135. As illustrated, a single project can belong to multiple different working sets, so long as the project satisfies the criteria as specified in the grouping rules for both working sets. For example, working set 150 includes project 110 and project 120, while working set 155 includes project 110 and project 115.

Referring back to FIG. 1A, in one embodiment, the IDE 105 includes a graphical user interface (GUI) 155. Through the graphical user interface 155, the IDE 105 can display development tools 150, data maintained by the project directory manager 145 (e.g., available projects, working sets, project directory structures, files, etc.) and so on. In one embodiment, projects included in a working set are displayed together to graphically show that they belong to the same working set. In another embodiment, the IDE 105 includes a command line interface.

Figure 2:
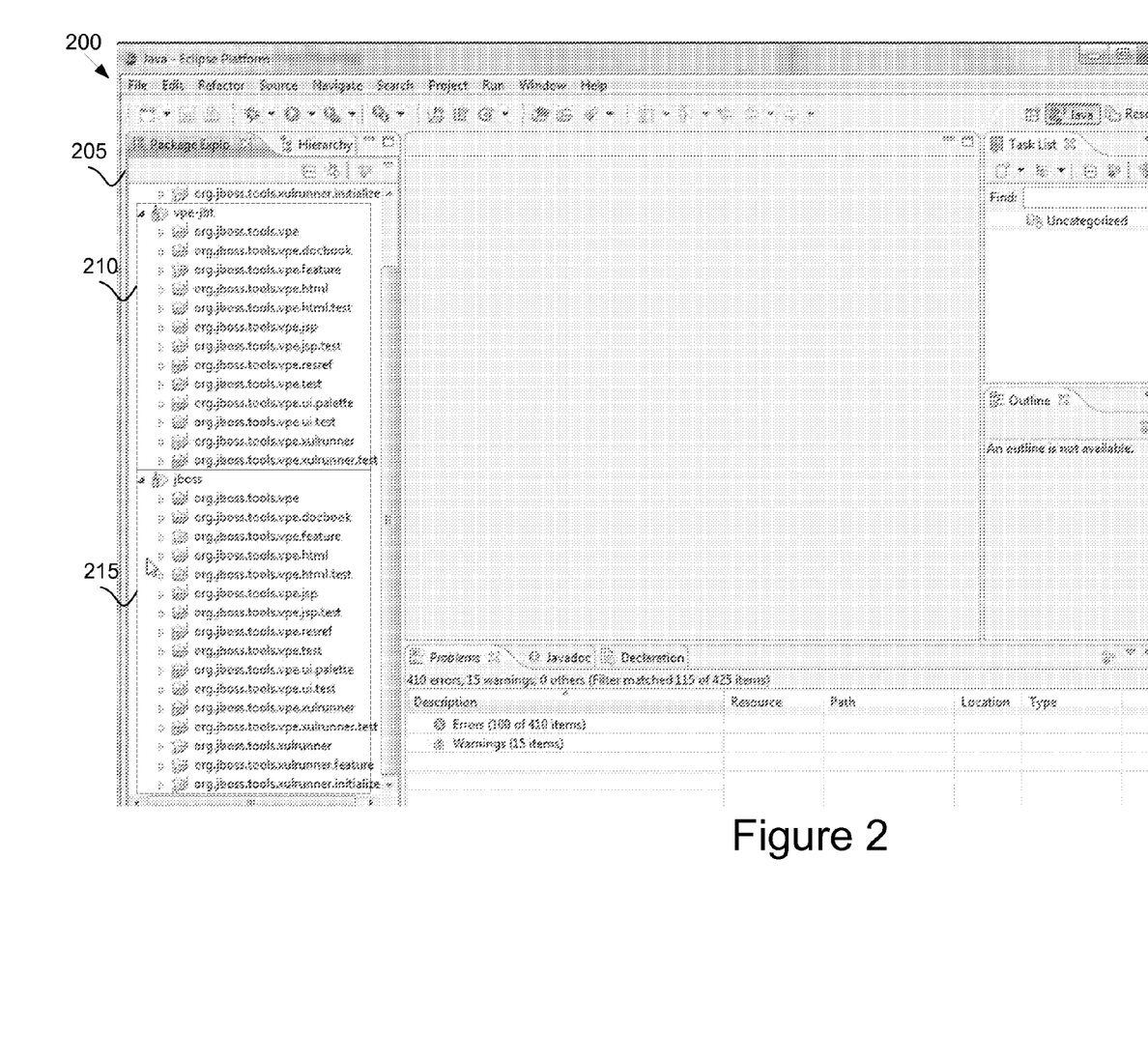
FIG. 2 illustrates a graphical user interface of an IDE, in accordance with one embodiment of the present invention.

FIG. 2 illustrates a graphical user interface 200 of an IDE, in accordance with one embodiment of the present invention. In one embodiment, the IDE corresponds to IDE 105 of FIG. 1A. The GUI 200 includes a project explorer 205, which in one embodiment corresponds to project directory manager 145 of FIG. 1A. The project explorer 205 includes multiple projects that have been divided into two working sets. A first working set 210 includes all "org.jboss.tools.vpe" projects, and a second working set 215 includes all "org.jboss.tools" projects. As shown, there is significant membership overlap between these two working sets.

The project explorer 205 in one embodiment organizes projects in a hierarchical manner. In one embodiment, the top of the hierarchy includes the working sets. Each working set includes one or more projects. Each project includes one or more folders, which may include sub-folders. Finally, each folder may include one or more files, which may contain source code. Therefore, users can navigate between working sets, projects, folders and sub-folders within projects, and individual files using the project explorer 205.

Figure 3A:
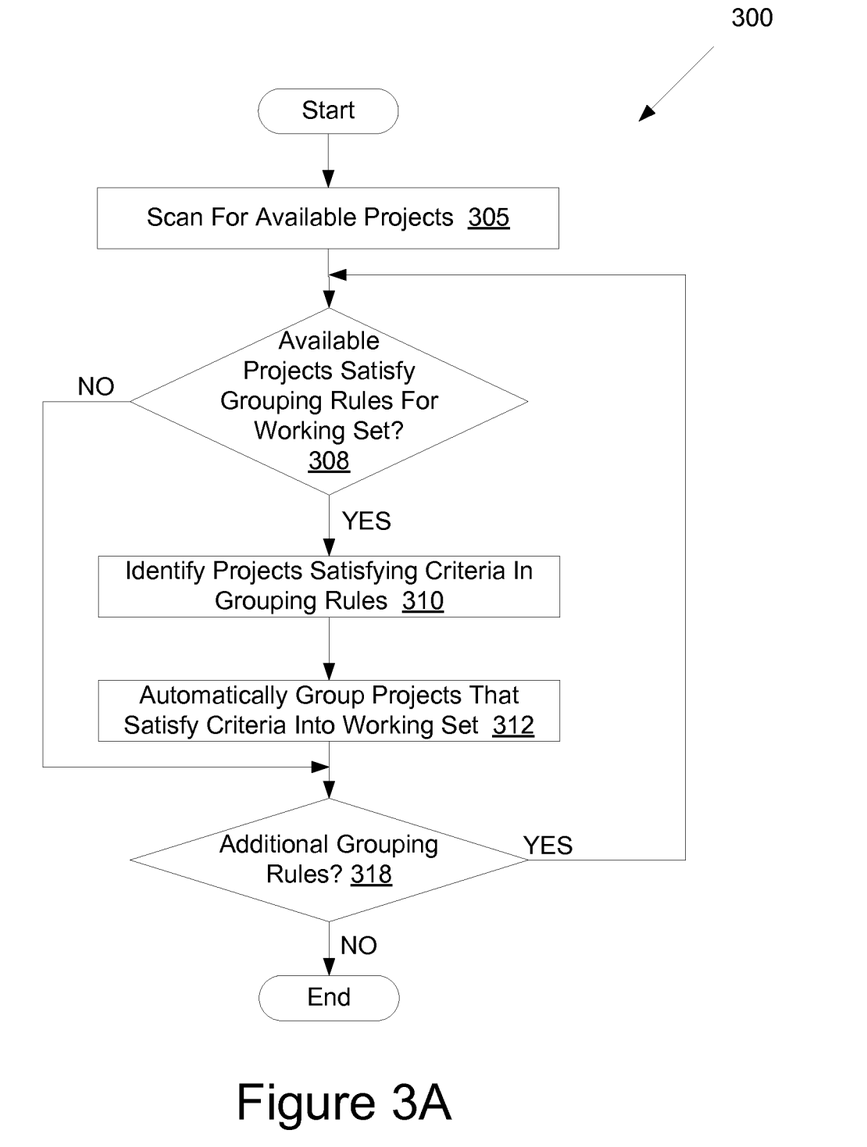
FIG. 3A illustrates a flow diagram of one embodiment for a method of automatically grouping projects into working sets in an IDE.

FIG. 3A illustrates a flow diagram of one embodiment for a method 300 of automatically grouping projects into working sets in an IDE. The method may be performed by processing logic that may comprise hardware (e.g., circuitry, dedicated logic, programmable logic, microcode, etc.), software (such as instructions run on a processing device), or a combination thereof. In one embodiment, method 300 is performed by the IDE 105 of FIG. 1.

Referring to FIG. 3, at block 305 of method 300, processing logic scans for available projects. The processing logic may scan for projects that are loaded into a memory of an IDE. The processing logic may also scan one or more storage devices for available projects.

At block 308, the processing logic compares the available projects to a set of grouping rules. If any of the available projects satisfies the criteria specified in the set of grouping rules, the method proceeds to block 310. The criteria may include a project name criterion, a file type criterion, a project directory structure criterion, etc. Otherwise, the method proceeds to block 318.

At block 310, the processing logic identifies those projects that satisfy the criteria. At block 312, the processing logic automatically generates a working set and adds the identified project or projects into the working set. The method then continues to block 318.

At block 318, the processing logic determines whether there are any additional sets of grouping rules that are associated with additional working sets. If there is at least one additional set of grouping rules that is to be checked, the method returns to block 308. In one embodiment, all sets of grouping rules are compared to the available projects. Alternatively, only those sets of grouping rules that have been user selected are compared to the available projects. For example, when a user adds a new set of grouping rules, he may only desire that the available projects be compared to that new set of grouping rules to generate a new working set.

Figure 3B:
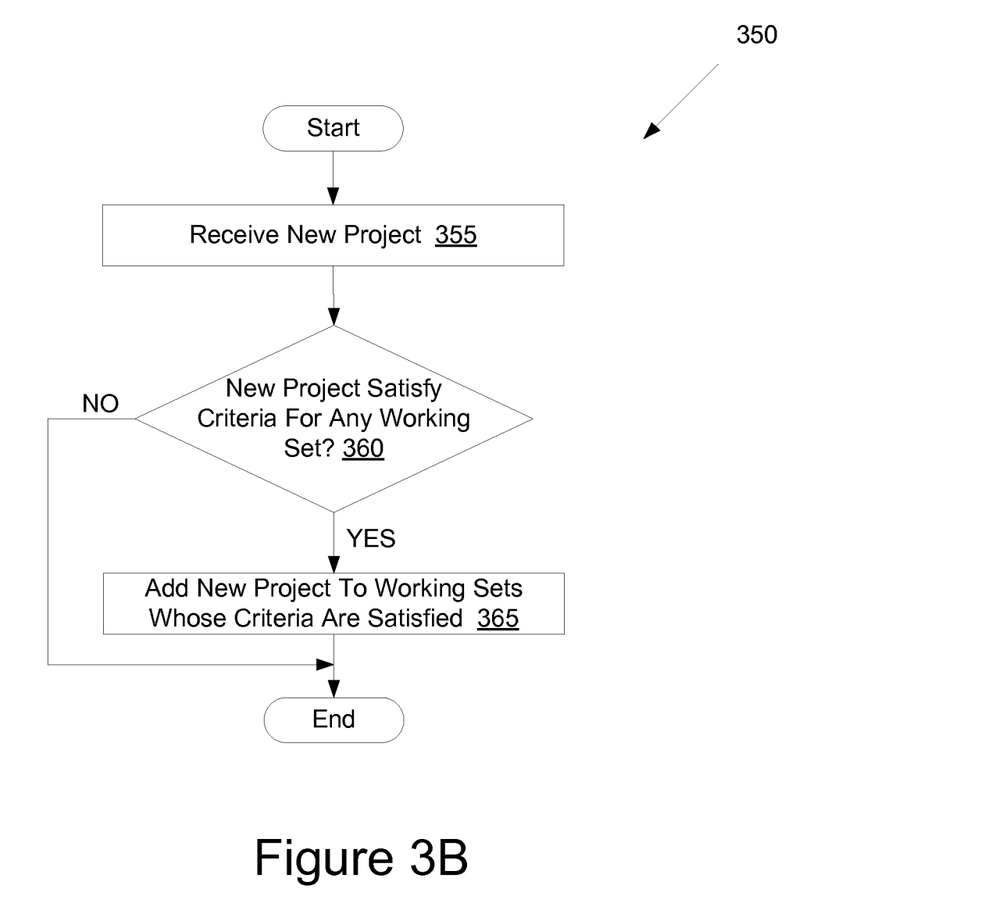
FIG. 3B illustrates a flow diagram of another embodiment for a method of automatically grouping projects into working sets in an IDE.

FIG. 3B illustrates a flow diagram of another embodiment for a method 350 of automatically grouping projects into working sets in an IDE. The method may be performed by processing logic that may comprise hardware (e.g., circuitry, dedicated logic, programmable logic, microcode, etc.), software (such as instructions run on a processing device), or a combination thereof. In one embodiment, method 350 is performed by the IDE 105 of FIG. 1.

Referring to FIG. 3B, at block 355 of method 350, processing logic receives a new project. At block 360, the processing logic automatically compares the new project to one or more sets of grouping rules to determine whether the new project satisfies the criteria for one or more working sets. In one embodiment, the processing logic compares the new project to each set of grouping rules to determine whether the new project belongs to any working set. If the new project satisfies the criteria for at least one working set, the method continues to block 365, and the new project is added to those working sets whose criteria were met by the new project. Otherwise the method ends.

The automatic grouping of projects into working sets performed by methods 300 and 350 can improve a user's efficiency by automatically performing actions that a user is otherwise required to do manually. Moreover, working sets can be generated based on preexisting grouping rules, so a user may not need to define grouping rules, further increasing efficiency.

A system that performs method 300 and/or method 350 automatically manages project organization for users. This can make it easier for users to locate and access desired projects, perform similar operations on multiple projects, and visualize project relationships. Thus, a user may spend less time managing project organization and more time writing programs.

Figure 4:
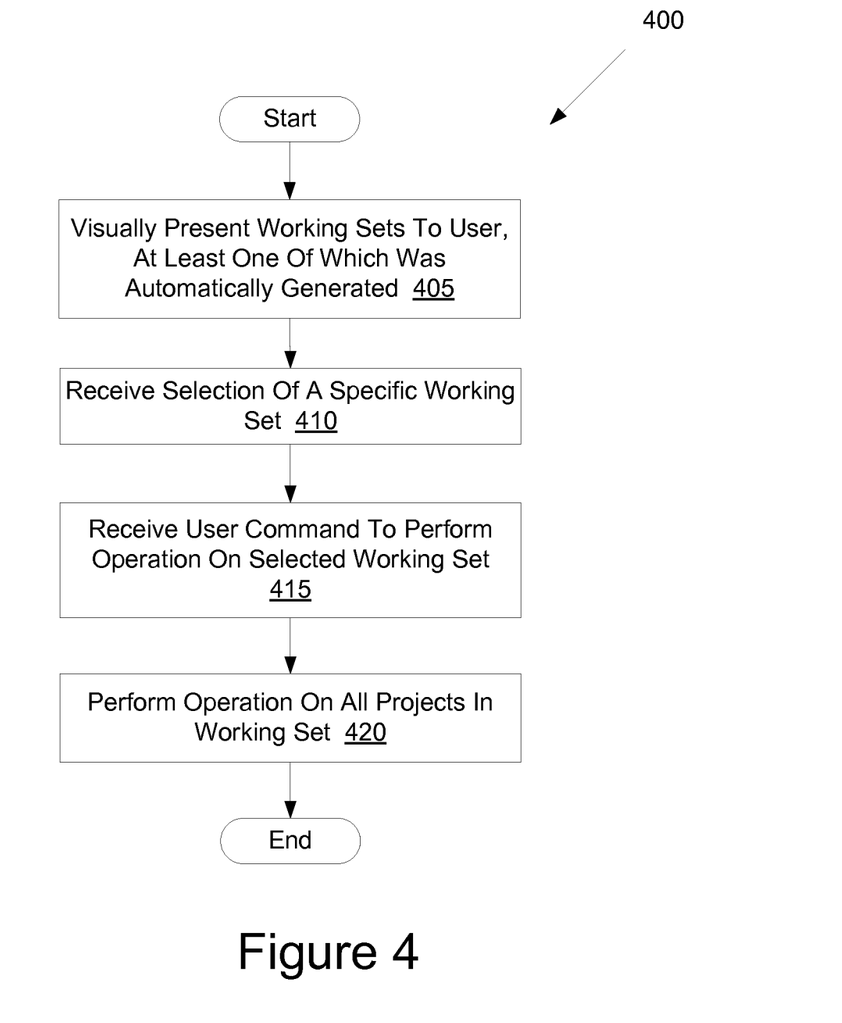
FIG. 4 illustrates a flow diagram of one embodiment for a method of performing an operation on an entire working set.

FIG. 4 illustrates a flow diagram of one embodiment for a method 400 of performing an operation on an entire working set. The method may be performed by processing logic that may comprise hardware (e.g., circuitry, dedicated logic, programmable logic, microcode, etc.), software (such as instructions run on a processing device), or a combination thereof. In one embodiment, method 400 is performed by the IDE 105 of FIG. 1.

Referring to FIG. 4, method 400 includes processing logic visually presenting one or more working sets to a user (block 405), at least one of the presented working sets having been generated using method 300 of FIG. 3A or method 350 of FIG. 3B.

At block 410, the processing logic receives selection of a specific working set. At block 415, the processing logic receives a user command to perform an operation on the selected working set. The operation may be a save operation, delete operation, subversion operation, build operation, etc. At block 420, the processing logic performs the operation on all projects included in the selected working set. The method then ends.

Method 400 enables a user to issue a single command to perform an operation on multiple related projects. This can save user time by reducing a number of commands that the user needs to issue.

Figure 5:
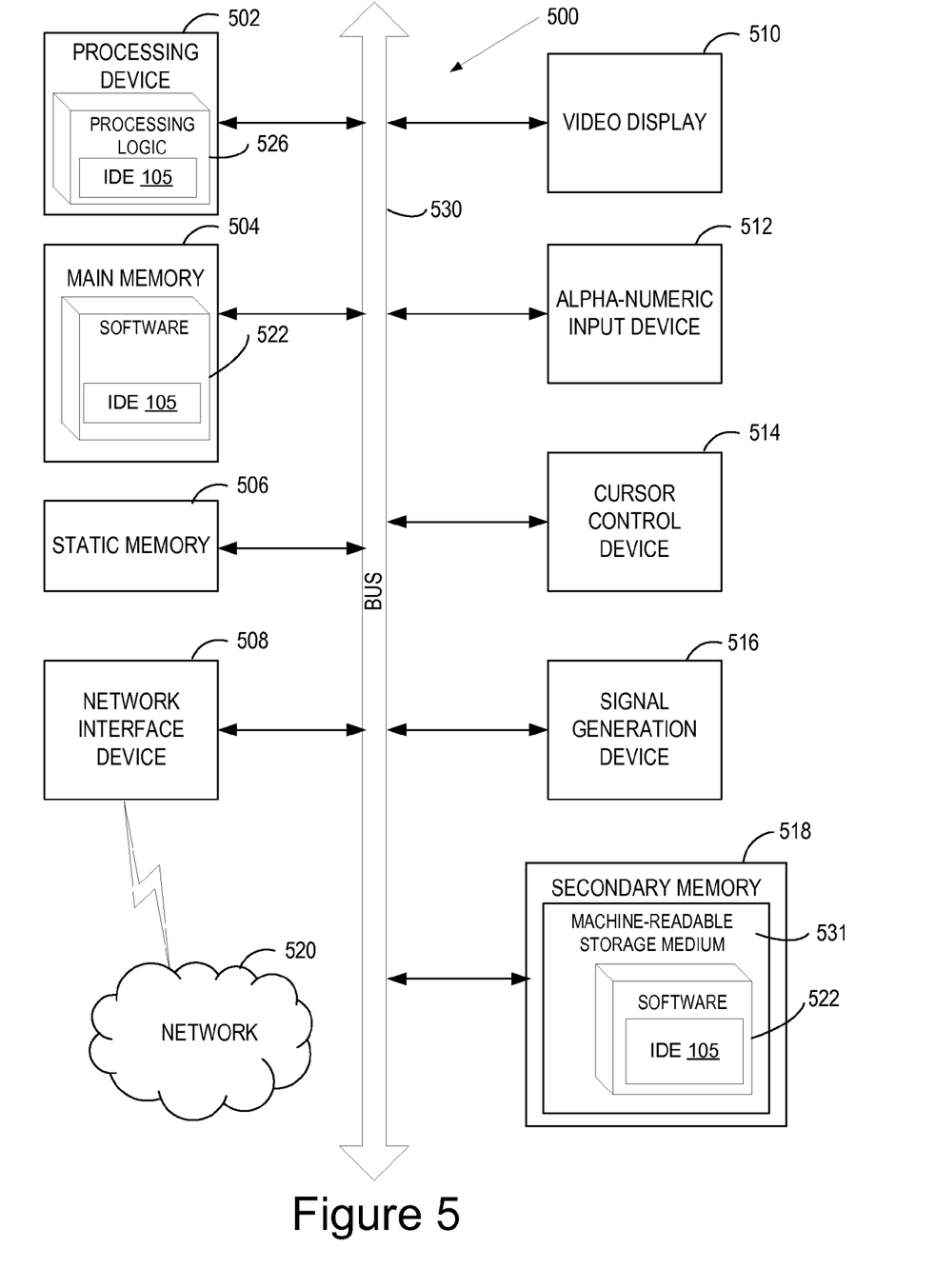
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the IDE 105 of FIG. 1, and/or a software library containing methods that call the IDE 105. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
scanning for available projects by a processing device executing an integrated development environment, each of the available projects having a directory structure that contains source code for an application or service;
identifying, by the processing device, a plurality of the available projects that match a criterion; and
automatically grouping, by the processing device, the plurality of available projects that match the criterion into a working set, wherein projects arranged into the working set are visually presented to a user together; and performing an operation on each of the plurality of projects in the working set responsive to a single user command.

2. The method of claim 1, wherein the operation is one of a delete operation, a rebuild operation and a subversion operation.

3. The method of claim 1, further comprising:
receiving a new project by the integrated development environment;
determining whether the new project matches the criterion; and
when the new project matches the criterion, automatically adding the new project to the working set.

4. The method of claim 1, wherein the criterion comprises one or more of a project name, a project's contents, a project directory structure, and a project type.

5. The method of claim 1, further comprising:
receiving new criteria for a new working set;
scanning for the available projects;
identifying the available projects that match the new criteria; and
automatically grouping the projects that match the new criteria into the new working set.

6. The method of claim 5, wherein at least one project is a member of both the working set and the new working set.

7. A computer readable storage medium including instructions for an integrated development environment that, when executed by a processing device, cause the processing device to perform operations comprising:
scanning for available projects by the processing device, each of the available projects having a directory structure that contains source code for an application or service;
identifying, by the processing device, a plurality of the available projects that match a criterion;
automatically grouping, by the processing device, the plurality of available projects that match the criterion into a working set, wherein projects arranged into the working set are visually presented to a user together; and
performing an operation on each of the plurality of projects in the working set responsive to a single user command.

8. The computer readable storage medium of claim 7, the operations further comprising:
receiving a user command to perform an operation on the working set;
performing the operation on each project in the working set.

9. The computer readable storage medium of claim 8, wherein the operation is one of a delete operation, a rebuild operation and a subversion operation.

10. The computer readable storage medium of claim 7, the operations further comprising:
receiving a new project by the integrated development environment;
determining whether the new project matches the criterion; and
when the new project matches the criterion, automatically adding the new project to the working set.

11. The computer readable storage medium of claim 7, wherein the criterion comprises one or more of a project name, a project's contents, a project directory structure, and a project type.

12. The computer readable storage medium of claim 7, the operations further comprising:
receiving new criteria for a new working set;
scanning for the available projects;
identifying the available projects that match the new criteria; and
automatically grouping the projects that match the new criteria into the new working set.

13. A computing system, comprising:
a memory to store instructions for an integrated development environment; and
a processing device, connected to the memory, to execute the instructions, wherein the instructions cause the processing device to:
scan for available projects, each of the available projects having a directory structure that contains source code for an application or service;
identify a plurality of available projects that match a criterion;
automatically group the plurality of available projects that match the criterion into a working set, wherein projects arranged into the working set are visually presented to a user together; and
perform an operation on each of the plurality of projects in the working set responsive to a single user command.

14. The computing system of claim 13, further comprising the instructions to cause the processing device to:
receive a user command to perform an operation on the working set; and
perform the operation on each project in the working set.

15. The computing system of claim 14, wherein the operation is one of a delete operation, a rebuild operation and a subversion operation.

16. The computing system of claim 13, further comprising the instructions to cause the processing device to:
receive a new project by the integrated development environment;
determine whether the new project matches the criterion; and
when the new project matches the criterion, automatically add the new project to the working set.

17. The computing system of claim 13, wherein the criterion comprises one or more of a project name, a project's contents, a project directory structure, and a project type.

18. The computing system of claim 13, further comprising the instructions to cause the processing device to:
receive new criteria for a new working set;
scan for the available projects;
identify the available projects that match the new criteria; and
automatically group the projects that match the new criteria into the new working set.

19. The computing system of claim 18, wherein at least one project is a member of both the working set and the new working set.

* * * * *

UNITED STATES PATENT AND TRADEMARK OFFICE
CERTIFICATE OF CORRECTION

PATENT NO.        : 8,527,940 B2
APPLICATION NO.   : 12/713060
DATED             : September 3, 2013
INVENTOR(S)       : Max Rydahl Andersen It is certified that error appears in the above-identified patent and that said Letters Patent is hereby corrected as shown below:

In the Claims

Claim 1, Col. 8, Line 63, "a criterion; and" should be "a criterion"

Signed and Sealed this
Nineteenth Day of November, 2013

Teresa Stanek Rea
*Deputy Director of the United States Patent and Trademark Office*